(12) United States Patent
Hiebert et al.

(10) Patent No.: US 6,325,437 B2
(45) Date of Patent: Dec. 4, 2001

(54) SLIDE-OUT COMPARTMENT FOR A VEHICLE

(76) Inventors: Grant W. Hiebert; Gerald W. Clancy; Ewan Smith, all of 5320-B 48th Avenue SE., Salmon Arm (CA), V1E 1X2

( * ) Notice: Subject to any disclaimer, the term of this patent is extended or adjusted under 35 U.S.C. 154(b) by 0 days.

(21) Appl. No.: 09/742,228

(22) Filed: Dec. 22, 2000

Related U.S. Application Data

(60) Provisional application No. 60/171,651, filed on Dec. 27, 1999.

(51) Int. Cl.$^7$ ................................................ B62C 1/06
(52) U.S. Cl. ............................ 296/26.01; 296/26.03; 296/26.12; 296/165; 296/172; 296/176
(58) Field of Search ....................... 296/26.01, 165, 296/171, 172, 175, 176, 26.12, 26.13, 26.03

(56) References Cited

U.S. PATENT DOCUMENTS

| | | | | |
|---|---|---|---|---|
| 3,719,386 | * | 3/1973 | Puckett et al. | 296/26 |
| 4,133,571 | * | 1/1979 | Fillios | 296/23 |
| 5,237,782 | * | 8/1993 | Cooper | 296/171 |
| 5,248,180 | * | 9/1993 | Hussaini | 296/171 |
| 5,560,667 | * | 10/1996 | Edry | 296/26 |
| 5,567,003 | * | 10/1996 | Gill | 296/173 |
| 5,570,924 | * | 11/1996 | Few et al. | 296/175 |
| 5,658,032 | * | 8/1997 | Gardner | 296/26 |
| 5,706,612 | * | 1/1998 | Tillett | 296/171 |
| 5,758,918 | * | 6/1998 | Schneider et al. | 296/26 |
| 5,785,373 | * | 7/1998 | Futrell et al. | 296/26.01 |
| 5,800,002 | * | 9/1998 | Tiedge et al. | 296/26 |
| 5,857,733 | * | 1/1999 | Dewald, Jr. et al. | 296/175 |
| 5,902,001 | * | 5/1999 | Schneider | 296/26.13 |
| 6,108,983 | * | 8/2000 | Dewald, Jr. et al. | 296/26.13 |

* cited by examiner

Primary Examiner—Joseph D. Pape
Assistant Examiner—Kiran B. Patel
(74) Attorney, Agent, or Firm—Anthony C. Edwards

(57) ABSTRACT

The apparatus of the present invention for selectively actuable relative movement in a first direction between a first vehicle compartment mountable or mounted to a second vehicle compartment includes a first actuator mounted to the first vehicle compartment for actuation in a second direction of a follower mounted on a distal end of the actuator. An elongate channel is mounted to the second vehicle compartment in a first plane substantially parallel to a plane containing both the first direction and the second direction. The second direction is angularly offset in the first plane from the first direction. The channel is generally diagonally offset in the first plane from the second direction. The follower is mountable or mounted in the channel for sliding engagement therealong upon actuation of the first actuator. Actuation of the first actuator causes the relative translation between the first and second vehicle compartments.

30 Claims, 9 Drawing Sheets

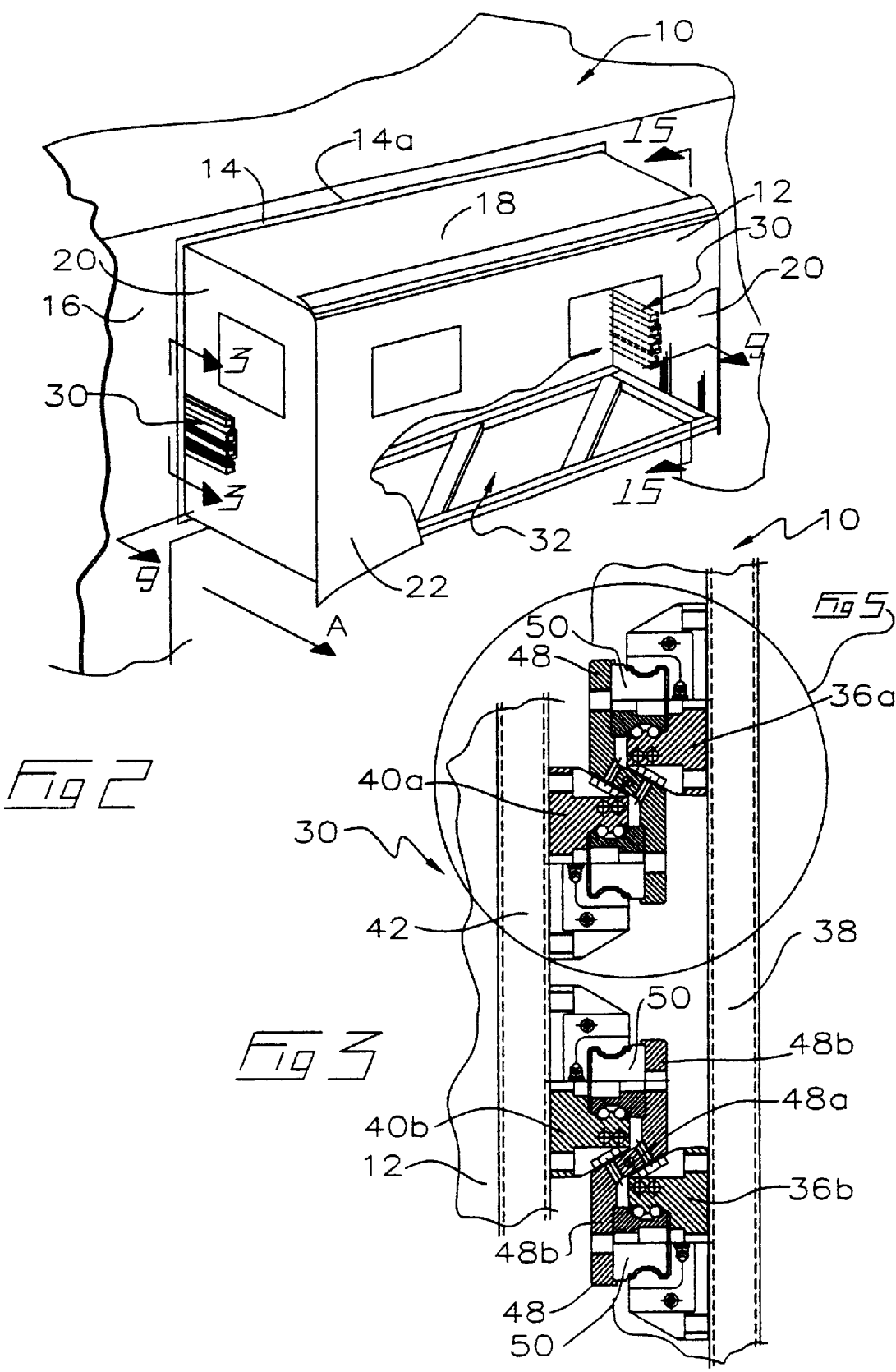

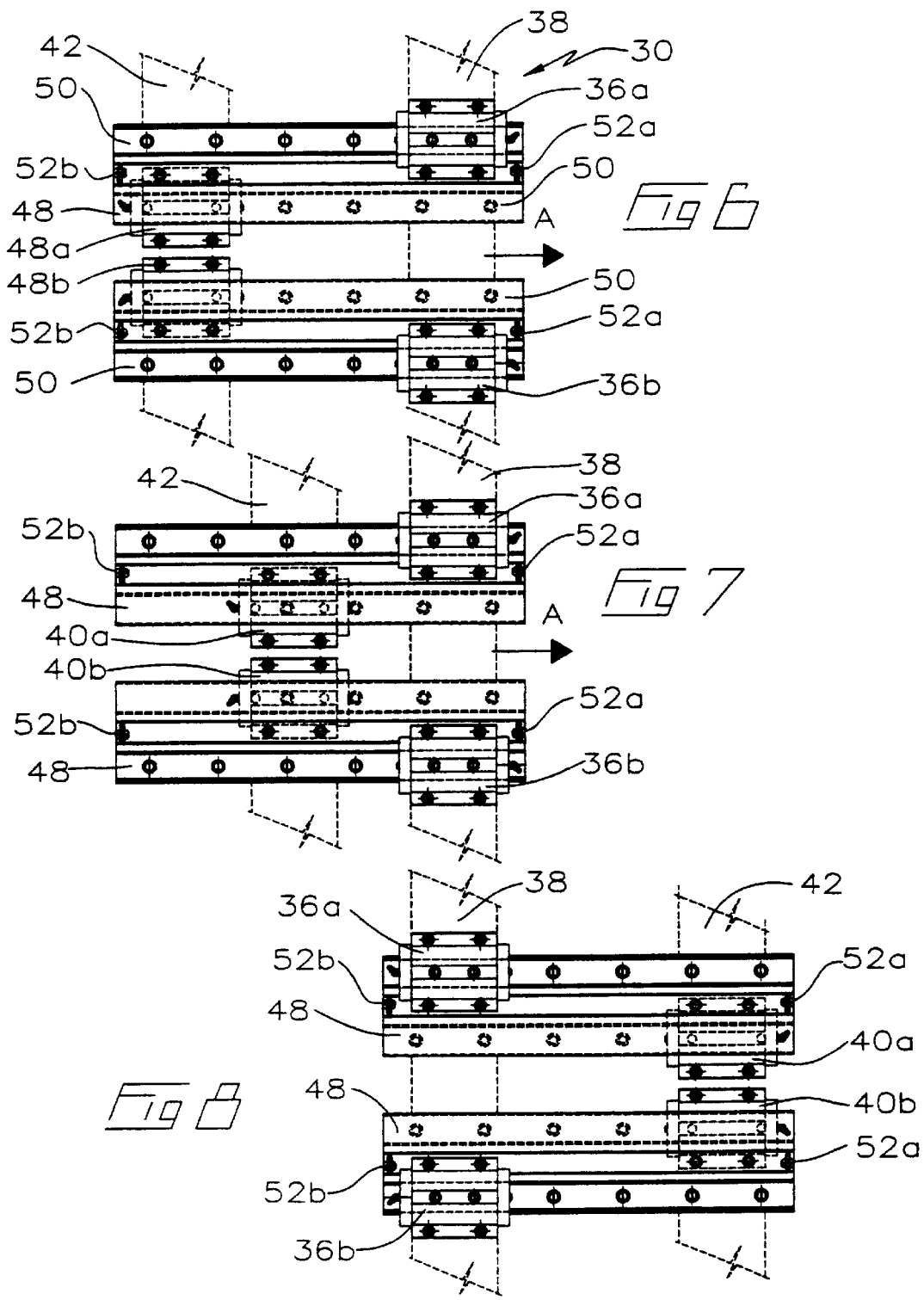

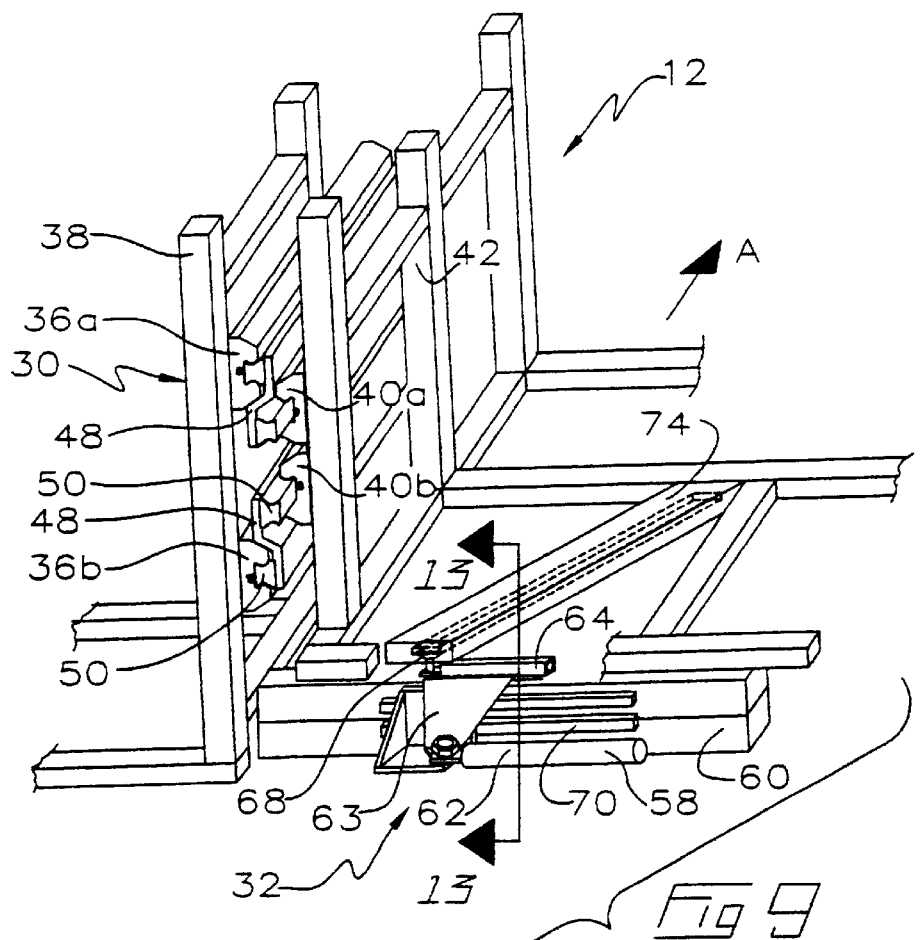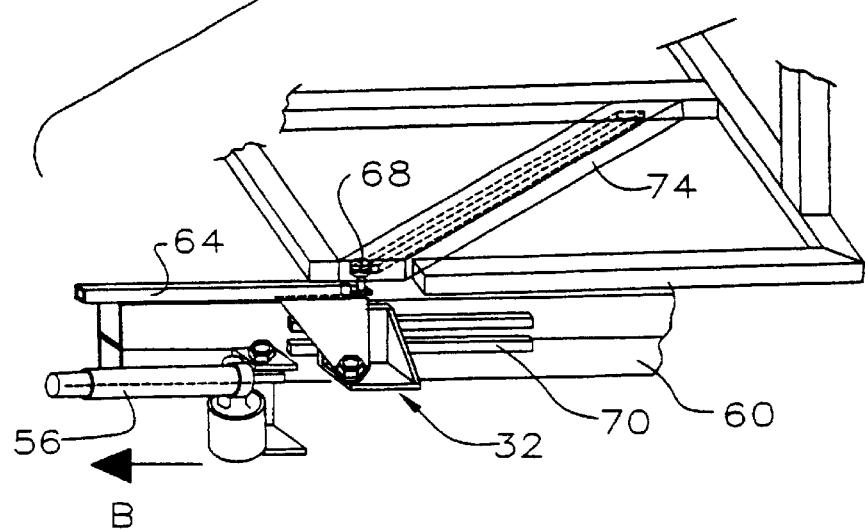

SLIDE-OUT COMPARTMENT FOR A VEHICLE

CROSS REFERENCE TO RELATED APPLICATION

This application claims priority from U.S. Provisional Patent Application No. 60/171,651 filed Dec. 27, 1999 titled Mechanism for a Bus Slide-Out Compartment.

FIELD OF THE INVENTION

This invention relates to devices for expanding the useable space within a vehicle and in particular to slide-out compartments for vehicles.

BACKGROUND OF THE INVENTION

It is known that the interior space of vehicles such as buses and recreational vehicles is limited by the exterior dimensions of the vehicle and in particular the width of the vehicle. In many cases the width of the vehicle is limited by a maximum allowable width for vehicles travelling on conventional roadways as determined and enforced by governmental bodies. As an example, in some jurisidictions, the width of recreational vehicles is limited to approximately 8½ feet. However, when the vehicle has been parked it is desirable to enlarge the useable space of the recreational vehicle beyond the maximum vehicle width allowable during use of the vehicle on the roadways. Thus in the prior art, applicant is aware of awnings and the like which extend laterally outwardly of the side of a parked recreational vehicle so as to provide additional room which is somewhat sheltered from the elements for use by the users of the recreational vehicle.

Also in the prior art, applicant is aware of U.S. Pat. No. 5,860,686 which issued Jan. 19, 1999 to Tiedge for a vehicle with adjustable occupancy space. Tiedge teaches an expandable occupiable section moveably coupled to a fixed section of a vehicle. The expandable section is selectively positionable on a carriage relative to the vehicle so as to adjust the volume of the living space of the vehicle. An actuator such as a threaded shaft and motor, rotates an arm so as to translate the expandable section relative to the vehicle.

SUMMARY OF THE INVENTION

In summary, the apparatus of the present invention for selectively actuable relative movement in a first direction between a first vehicle compartment mountable or mounted to a second vehicle compartment includes a first actuator mounted to the first vehicle compartment for actuation in a second direction of a follower mounted on a distal end of the actuator. An elongate channel is mounted to the second vehicle compartment in a first plane substantially parallel to a plane containing both the first direction and the second direction. The second direction is angularly offset in the first plane from the first direction. The channel is generally diagonally offset in the first plane from the second direction. The follower is mountable or mounted in the channel for sliding engagement therealong upon actuation of the first actuator. Actuation of the first actuator causes the relative translation between the first and second vehicle compartments.

The first vehicle compartment may be a vehicle and the second vehicle compartment may be a laterally-extendable compartment for the vehicle. The laterally extendable compartment may be laterally translatably mountable or mounted into the aperture in a side of a vehicle for lateral extension therefrom in the first direction into an extended position and for lateral retraction thereinto into a retracted position.

In the retracted position a laterally outer surface of the laterally extendable compartment may be generally flush with a laterally outer surface of the vehicle. In the extended position the laterally extendable compartment is cantilevered laterally outwardly from the aperture and the laterally outer surface of the vehicle.

The channel may be mounted to the laterally extendable compartment wherein the first plane is parallel to the floor. Herein, reference to mounting of the channel is intended to include any manner of mounting of, or forming into, a channel member or channel shape respectively to or into the floor. Actuation of the follower by translation of the follower in the second direction may be generally perpendicular to the first direction. Actuation of the actuator so as to translate the follower in the second direction forces relative lateral translation in the first direction between the laterally extendable compartment and the vehicle.

The channel may be, in plan view, angled generally diagonally from a first end of the channel disposed towards the interior of the vehicle to an opposite second end of the channel disposed towards the exterior of the vehicle. Thus, with the first actuator mounted so that the second direction is substantially perpendicular to the first direction, the first actuator may be adjacent the second end of the channel and retracted when the laterally extendable compartment is in the fully retracted position. The first actuator may be adjacent the first end of the channel and extended when the laterally extendable compartment is in the fully extended position. The channel may be substantially linear and may form an acute angle of generally 60 degrees between the channel and the second direction on a side of the channel opposite from the first actuator.

The first actuator may be mounted to a vehicle frame member extending longitudinally along the vehicle and underneath a floor of the laterally extendable compartment. The first and second ends of the channel may have corresponding first and second notches formed in side surfaces of the first and second ends for parking the follower into the first or second notches. When so parked, the follower is out of operative alignment with the length of the channel extending from the first end to the second end when the laterally extendable compartment is in the fully extended or retracted positions respectively. The first and second notches may be angled end portions of the channel.

The laterally extendable compartment includes a compartment floor. The compartment floor is substantially parallel to at least a portion of the vehicle floor adjacent the laterally extendable compartment when in the retracted position. The vehicle floor includes a retractable floor panel, retractable beneath the compartment floor when the laterally extendable compartment is in the retracted position, and elevatable so as to be flush with the portion of the vehicle floor when the laterally extendable compartment is in the fully extended position. The floor panel may be retractable and extendable by actuation of a second actuator mounted to and between the floor panel and a vehicle frame member. The second actuator may be a linear actuator actuating a pivotal linkage pivotally mounted to the linear actuator and the floor panel.

The laterally extendable compartment may be mountable or mounted in the aperture on rails. The rails may be a pair of rails, one rail of the pair of rails on opposite longitudinal end of the laterally extendable compartment. The pair of rails may be slidably mounted on slides oppositely mounted on either side of each rail. One rail may be mounted to each longitudinal ends of the laterally extendable compartment and corresponding longitudinal ends of the aperture in the side of the vehicle.

The rails may be, in vertical cross-section, generally Z-shaped. The slides may be slidably mountable to ends of the Z-shape so as to mount the slides mounted to the longitudinal ends of the aperture in vertically spaced relation to the slides mounted to the longitudinal ends of the laterally extendable compartment. The slides may be mounted to the longitudinal ends of the aperture so as to generally, that is so as to at least in part, vertically align over the slides mounted to the longitudinal ends of the laterally extendable compartment.

The channel may be a first channel and the follower a first follower, so that the apparatus further includes a second channel parallel to the first channel and lying in the first plane, and a second follower rigidly mounted to, and longitudinally spaced apart from, the first follower by a rigid spacer. The second follower slidably engages the second channel and forceably slides therealong upon actuation of the first actuator.

BRIEF DESCRIPTION OF THE DRAWINGS

FIG. 2 is an enlarged perspective view of a slide-out room compartment partially broken away.

FIG. 3 is an enlarged sectional view along line 3—3 of FIG. 2.

FIG. 6 is a side elevational view of the slide-out room supporting mechanism of FIG. 4 in the fully retracted position.

FIG. 7 is a side elevational view of the slide-out room supporting mechanism of FIG. 6 in a partially extended position.

FIG. 8 is a side elevational view of the slide-out room supporting mechanism of FIG. 7 in a fully extended position.

FIG. 9 is a perspective partially cut-away view generally along line 9—9 of FIG. 2, illustrating both the actuating mechanism and one of the pair of supporting mechanisms for the slide-out room compartment.

DETAILED DESCRIPTION OF EMBODIMENTS OF THE INVENTION

Figure 1:
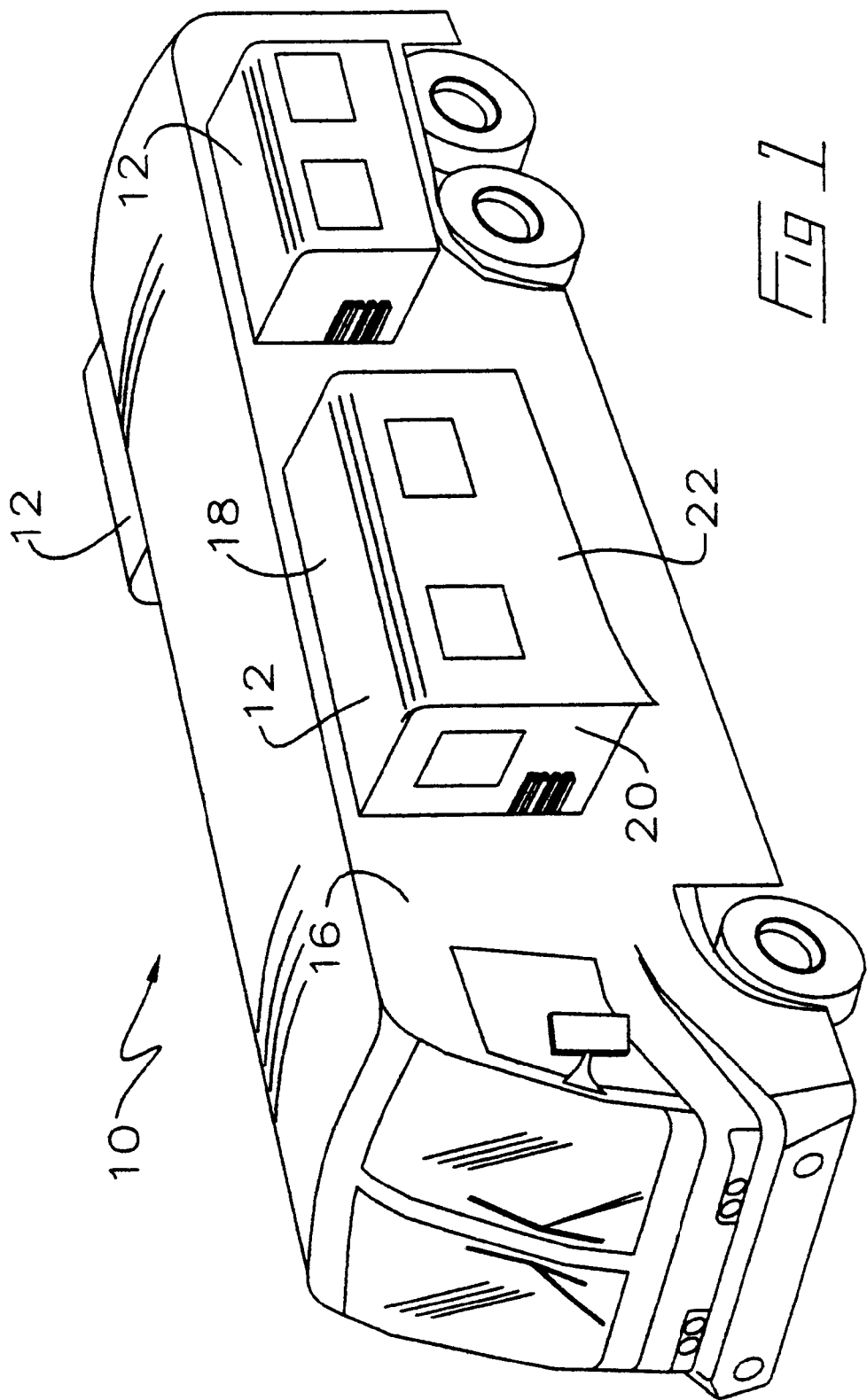
FIG. 1 is a perspective drawing of a vehicle having incorporated therein fore and aft slide-out room compartments illustrated in the fully outwardly extended position.
Figure 4:
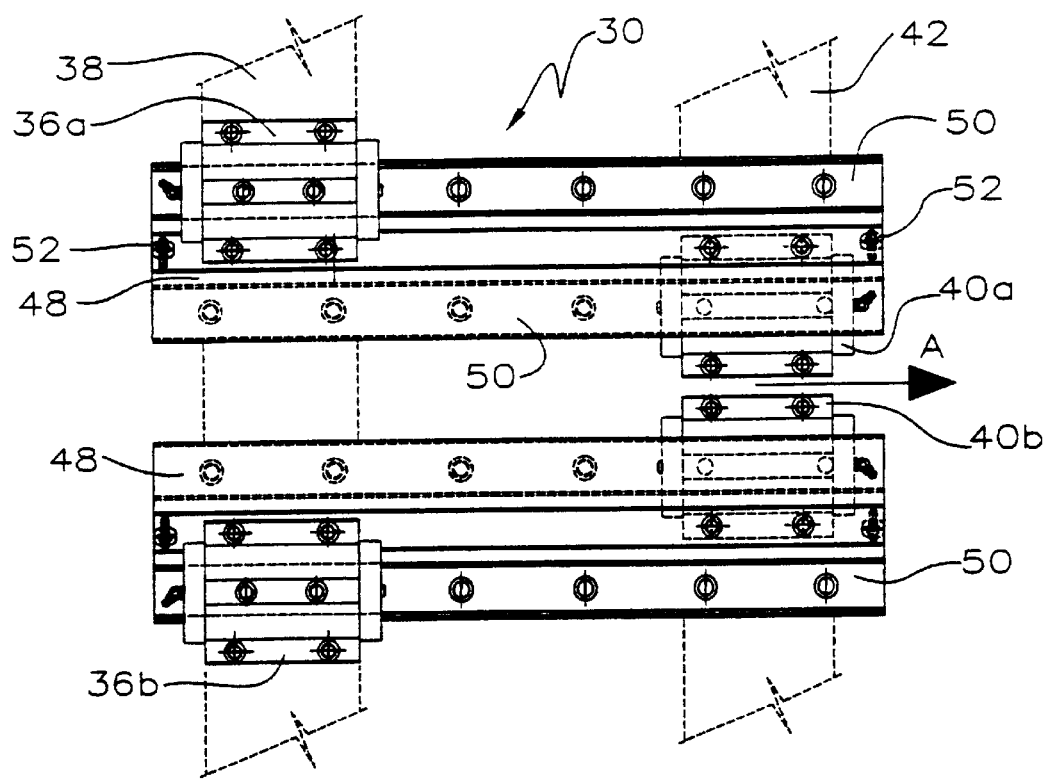
FIG. 4 is an enlarged right side elevational view of the slide-out room supporting mechanism of FIG. 2.
Figure 5:
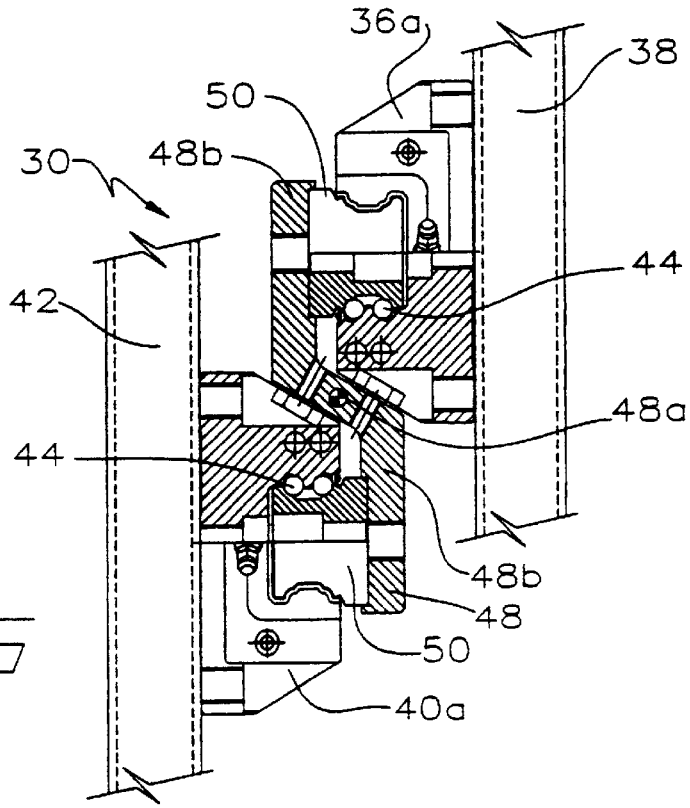
FIG. 5 is an enlarged view of a portion of the slide-out room supporting mechanism of FIG. 3.

With reference to FIGS. 1 and 2, there is illustrated a vehicle 10 incorporating fore and aft slide-out room compartments 12. Vehicle 10 may be, without limitation, a bus, coach, recreational vehicle or the like. Although two slide-out compartments are illustrated, this is not intended to be limiting as one or more slide-out compartments in any one vehicle are intended to fall within the scope of the invention. Slide-out compartments 12 are normally retracted so as to be generally flush with the sides of the vehicle when the vehicle is in motion. Once the vehicle is parked, slide-out compartments 12 may be translated laterally outwardly of the vehicle sides to expand the interior living space of the vehicle, that is, by lateral translation in direction A of compartments 12 outwardly of side walls 16. Slide-out compartments 12 are laterally slidable within an opening 14 formed within a side wall 16 of the vehicle. Each compartment 12 may have a roof 18, opposed end walls 20, a side wall 22 and floor 24 which enclose an interior living space. Side wall 22 of slide-out compartment 12 may be generally parallel to side wall 16 of the vehicle. The perimeter 14a of wall opening 14 is formed or adapted so as to provide a weather seal against the exterior surfaces of slide-out room compartments 12.

Slide-out compartments 12 may be fabricated from stainless steel or other structurally rigid, relatively light weight material. The lateral translation within opening 14 of slide-out room compartment 12 in direction A, and in a direction opposite to direction A, that is, in a direction orthogonal to side walls 16, is accomplished by use of slide-out support mechanisms 30 and slide-out actuator mechanism 32.

With reference to FIGS. 3–8, slide-out support mechanisms 30 comprise first upper and lower 'C' shaped brackets 36a and 36b respectively which are mounted to frame members 38 of vehicle 10. Second upper and lower 'C' shaped brackets 40a and 40b respectively are mounted to frame members 42 of slide-out compartment 12. Brackets 36a, 36b and 40a, 40b each translate relative to rails 50 on roller bearings 44 sandwiched between the brackets and rails.

Upper and lower 'Z' shaped brackets 48 have an intermediate web portion 48a and integrally formed, end flanges 48b. Rails 50 are mounted to flanges 48b so as to be oriented toward, i.e. into the openings of, 'C' shaped brackets 36a, 36b and 40a, 40b. Rails 50 are slidably journalled in 'C' shaped brackets 36a, 36b and 40a, 40b, for freely sliding travel therethrough on roller bearings 44. It is understood that the bearings might be replaced with other slides or sliding means such as plastic slides. 'Z' shaped brackets 48, because of their cross-sectional shape, reduce the amount of separation between vehicle frame members 38 and slide-out compartment frame members 12.

Stops 52 are mounted near each longitudinal end of flanges 48b of 'Z' shaped brackets 48. 'C' shaped brackets 36a, 36b and 40a, 40b engage stops 52 near the limit of travel of the brackets along the rails so as to stop the brackets from running off the ends of the rails.

In FIG. 6, one slide-out support mechanism 30 is depicted fully retracted, that is, when compartment 12 is retracted within vehicle 10. As actuator mechanism 32, seen in FIGS. 9–13, is actuated as better described below, slide-out compartment 12 translates laterally outward of vehicle 10 in direction A. It may be that in one embodiment, not intended to be limiting, relatively low friction between roller bearings 44 and both the inner surfaces of 'C' shaped brackets 36a, 36b, 40a, 40b and rails 50 provide for slide-out 12 to translate in direction A independently from any movement of 'Z' shaped bracket 48 and attached rails 50 so that as seen in FIGS. 6–8, firstly, brackets 40a and 40b (mounted to slide-out frame members 42) slide relative to rails 50, rails 50 remaining stationary relative to brackets 36a and 36b (mounted to frame members 38 of vehicle 10). Once brackets 40a and 40b engage stops 52a on rails 50, rails 50 commence translation in direction A relative to brackets 36a and 36b until stops 52b engage brackets 36a and 36.

Actuator mechanism 32 may be a linear actuator including a piston (or other prime mover) housing 56 and a telescopic ram 58. The actuator may be electrically, hydraulically or pneumatically actuated. Actuator mechanism 32 may be mounted below the normal flooring of vehicle 10, as close as practicable to side wall 16. Housing 56 of actuator may be securely mounted to horizontal frame members 60 of vehicle 10 so as to resist forces resulting from extension or retraction of ram 58. By use of the retractable vehicle flooring better described below, actuator mechanism 32 may be positioned so that floor 24 of slide-out compartment 12 is flush with the floor of the vehicle.

The distal end 62 of ram 58 is rigidly mounted, by bracket 63, to elongate coupler shaft 64. Shaft 64 extends parallel to the longitudinal axis of ram 58 and carries, rotatably mounted thereon, cam follower wheel 68 at each of its ends. Coupler shaft 64 and cam follower wheels 68 are maintained in parallel alignment with the longitudinal axis of ram 58 during its extension and retraction cycle by 'C' shaped brackets 66, mounted to coupler shaft 64, sliding along rails 70 mounted on vehicle frame members 60. Follower wheels 68 are mounted into parallel cam recesses or channels 72 machined into the underside of cam plates 74. Coupler shaft 64 may be replaced by other means (hydraulic, electrical drive by way of example not intended to be limiting) for synchronizing the cam followers for simultaneous sliding of follower wheels 68 along channels 72. Angled parking notches 76 may be formed at the ends of cam channels 72. When ram 58 is either fully extended or fully retracted, cam follower wheels 68 are removed from cam channels 72 and are parked nested within the notches 76. This inhibits unintended lateral movement (i.e. in direction A) of slide-out compartment 12. Cam plates 74 are mounted to the frame members on the underside of slide-out compartment 12.

Figure 10:
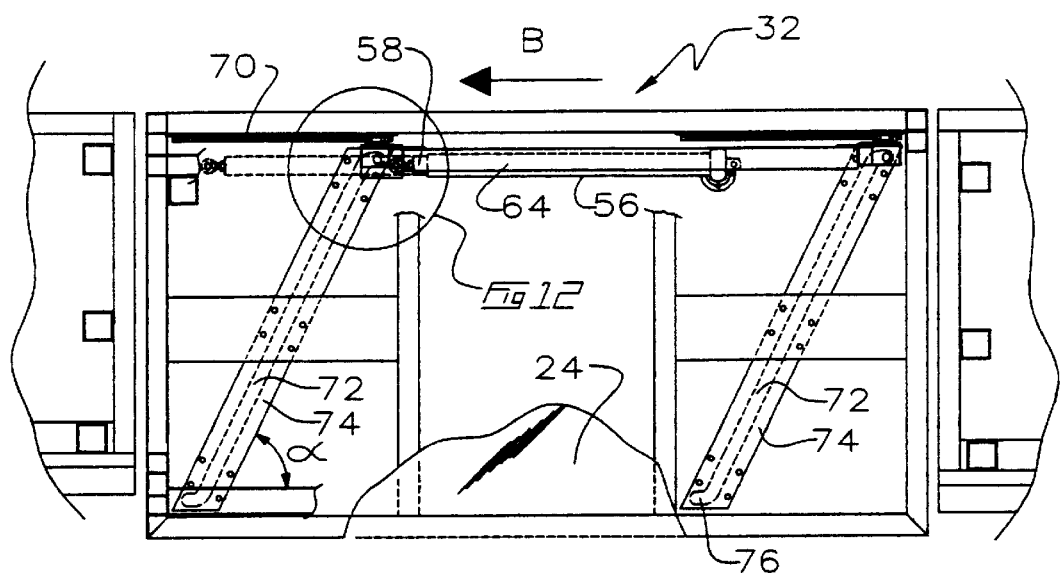
FIG. 10 is a plan view illustrating the floor frame of the slide-out room compartment, with both the slide-out compartment and the actuating mechanism in the fully retracted position.
Figure 11:
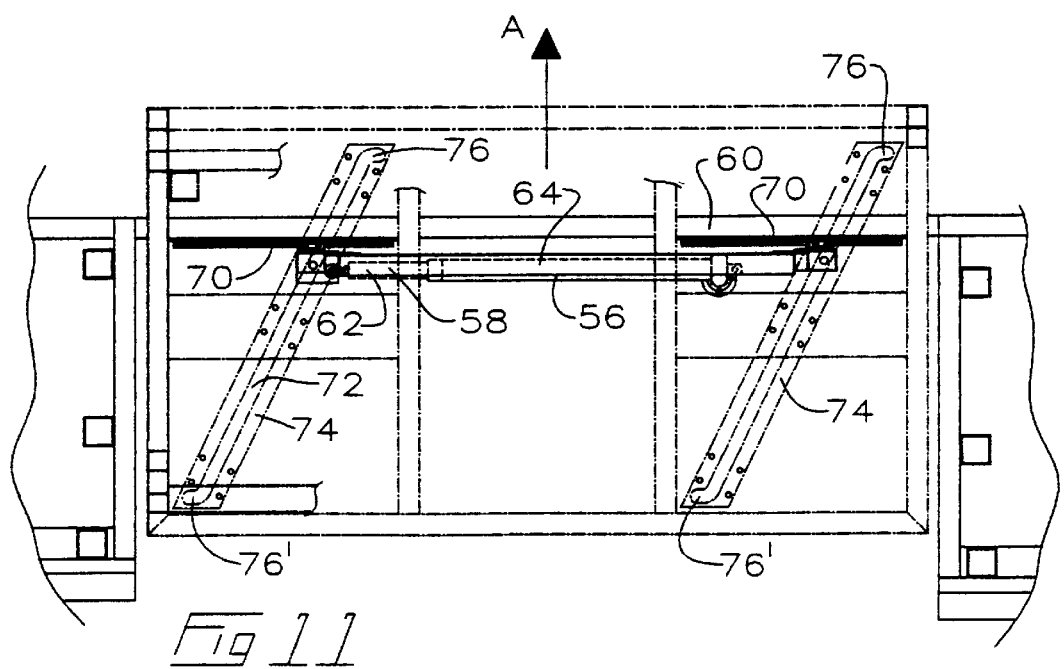
FIG. 11 is a plan view illustrating the slide-out compartment and the actuating mechanism of FIG. 10 in a partially extended position.
Figure 12:
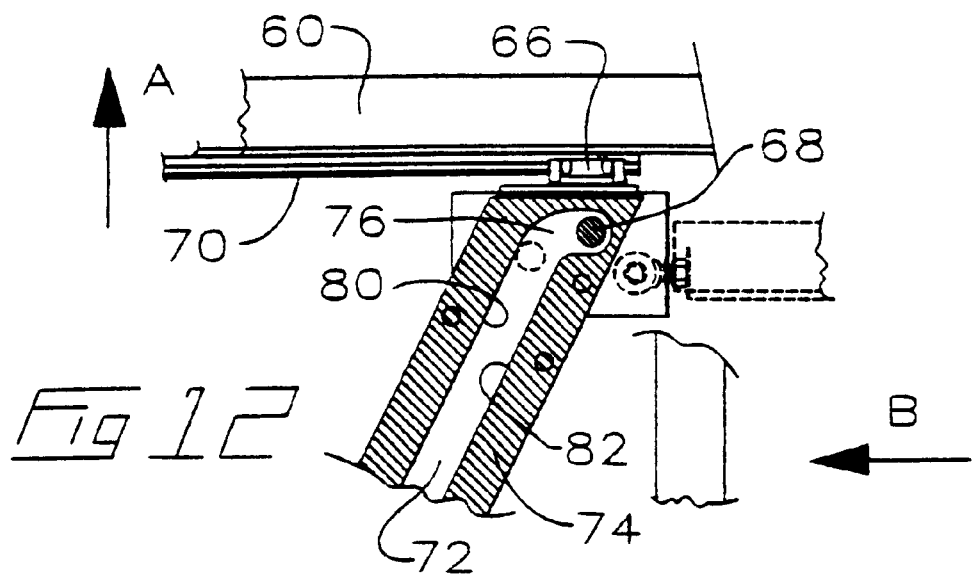
FIG. 12 is an enlarged view of a portion of FIG. 10.
Figure 13:
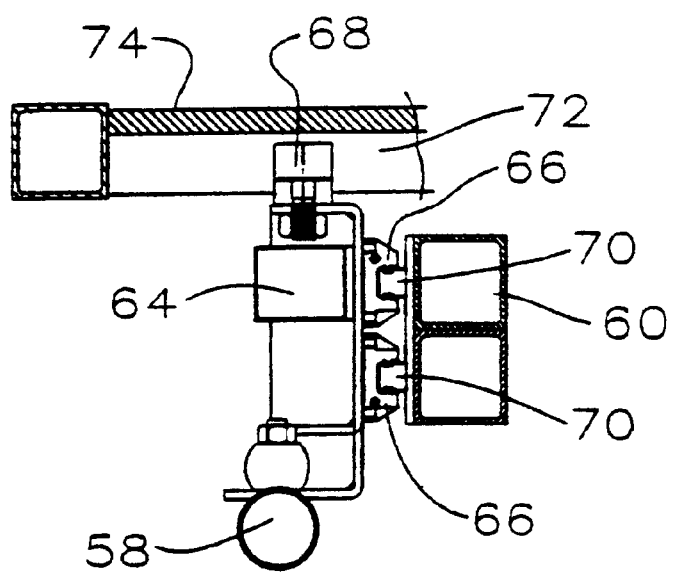
FIG. 13 is a sectional view taken on line 13—13 of FIG. 9.

Actuation of mechanism 32 results in the extension of ram 58 in direction B. With slide-out compartment 12 in the fully retracted position as illustrated in FIGS. 10 and 12, cam follower wheels 68 are firstly removed from the locking position within angled notches 76 at the ends of cam channels 72. Further travel of ram 58 in direction B results in wheels 68 applying a force in direction B against the forward side surfaces 80 of cam channels 72. As movement of housing 58 is prevented by reason of its mounting to vehicle frame 60, wheels 68 are forced against and along surfaces 80 by a vector component in direction A of the force applied in direction B. Channels 72 are angled so as to produce the force vector component in direction A, which in result produces the lateral translation of slide-out compartments 12. Channels 72 may be angled by an angle $\alpha$ of approximately 60 degrees. As wheels 58 are directly connected for simultaneous movement with ram 58 by coupler shaft 64, slide-out compartment 12 moves laterally outward in a direction parallel to support mechanism 30. Once fully extended, wheels 68 park in angled notches 76' so as to lock out unintended lateral movement of the compartment.

Slide-out compartment 12 may be translated in a lateral direction opposite to direction A so as to retract the compartment by movement of ram 58 in a direction opposite to direction B. A force is applied against rearward side surfaces 82 of cam channels 72 by wheels 68, resulting in an inwardly lateral translation of slide-out compartment 12, inwardly into vehicle 10.

Figure 14:
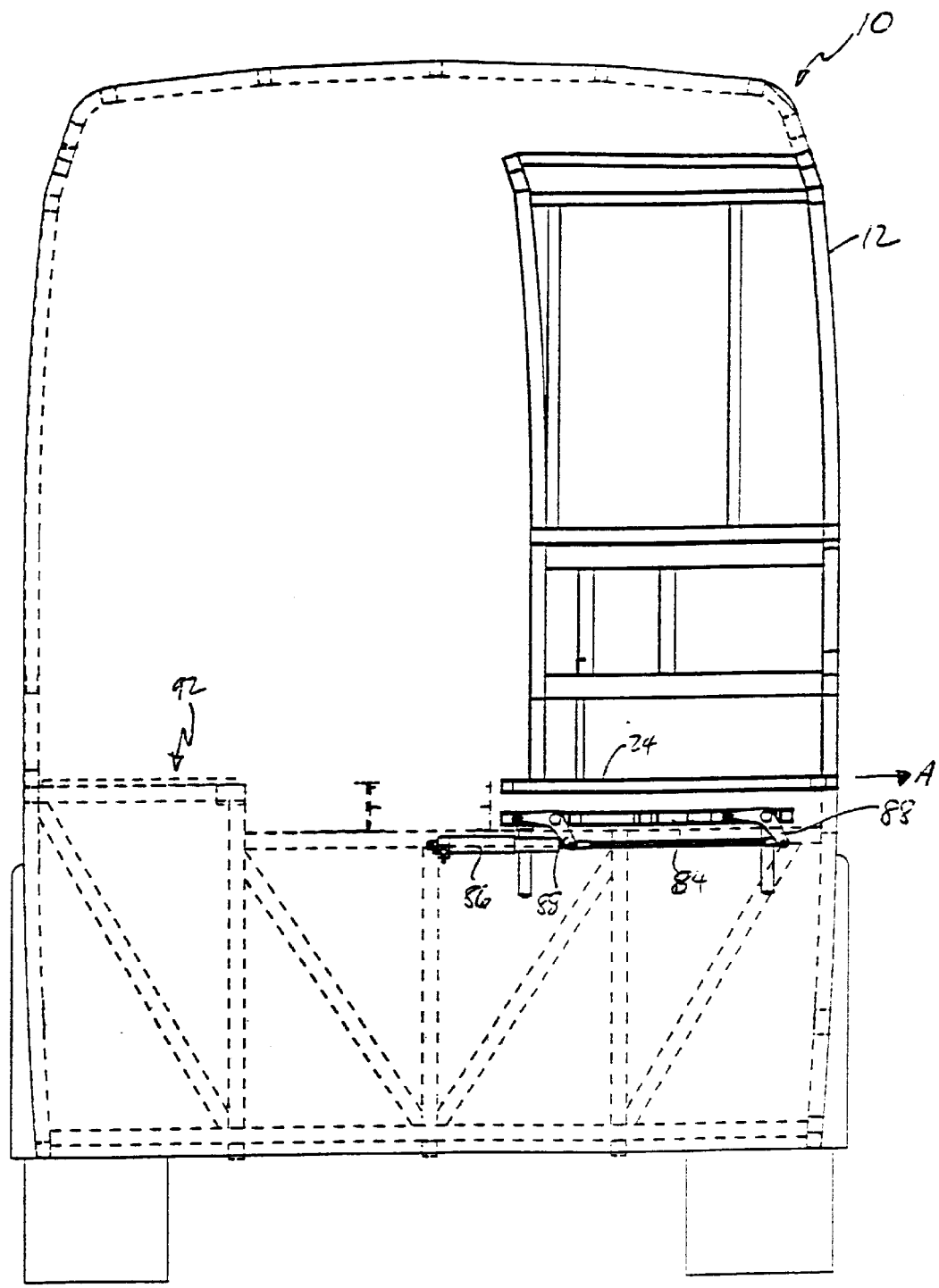
FIG. 14 is the view of FIG. 15 with the slide-out compartment retracted.
Figure 15:
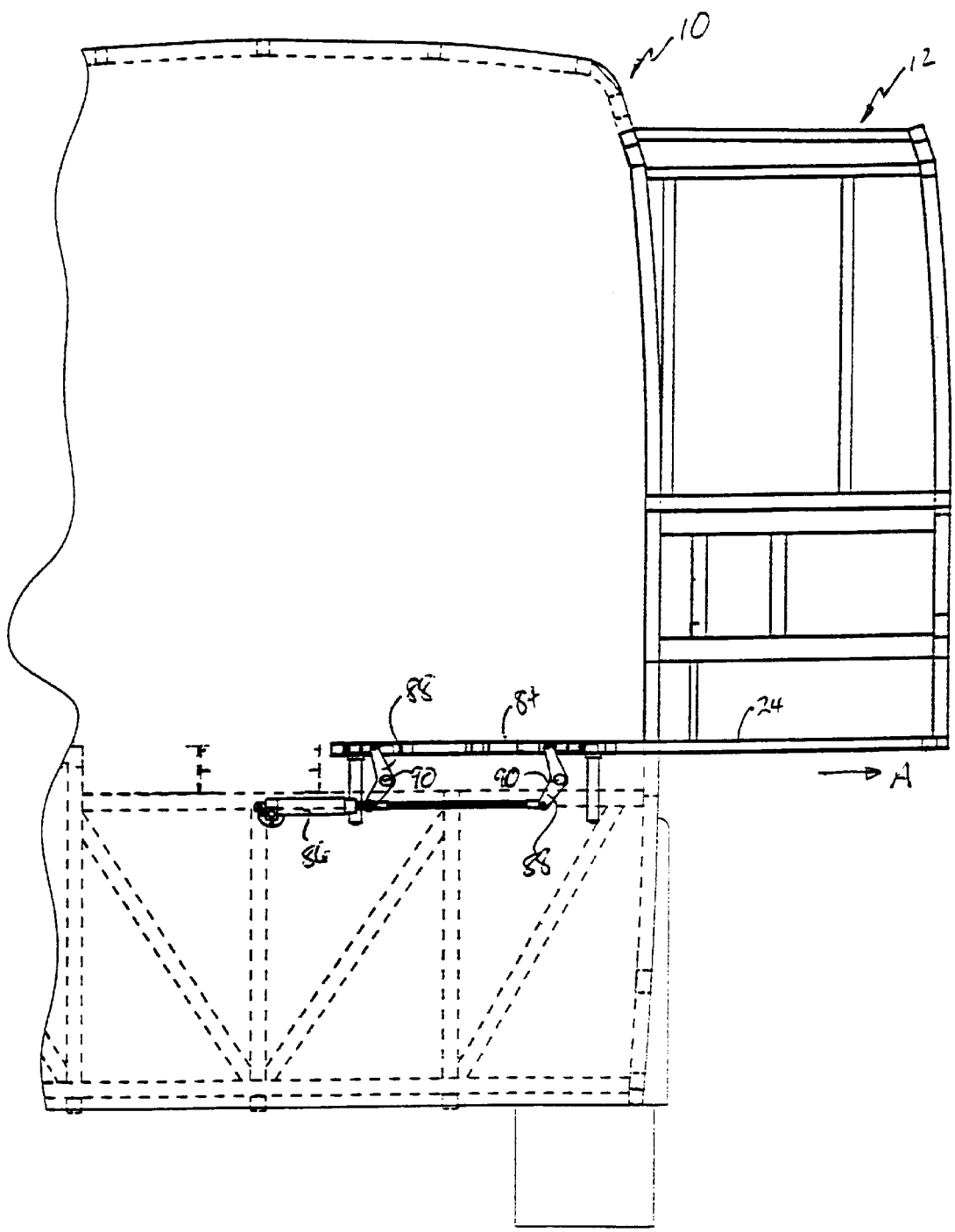
FIG. 15 is a partially cut-away sectional view along line 15—15 in FIG. 2.

As seen in FIGS. 14 and 15, with slide-out compartment 12 either fully retracted as seen in FIG. 14 or during deployment of slide-out compartment 12 into its fully deployed position as seen in FIG. 15, retractable floor panel 84 remains in its lowered position so as to provide clearance for the floor of compartment 12 in the embodiment in which the floor of compartment 12 is mounted generally flush with the interior floor of vehicle 10. Once compartment 12 has been fully extended, retractable floor panel 84 may be elevated for example by means of actuator 86 rotating arms 88 about pins or shafts 90. The pivoting linkage provides the vertical lift of the floor panel by means of a cam follower that is captured in a horizontal channel in the floor. This floor movement is then further restricted to a vertical direction by the vertically oriented pins which are fastened to the underside of the floor and which slide through bushings that are fixed into the coach frame below the floor. Thus, selective actuation of actuator 86 provides for elevation of floor panel 84 while maintaining floor panel 84 parallel to the interior floor 92 of vehicle 10 and floor 24 of compartment 12.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for selectively actuable relative movement between vehicle compartments comprising:

a first vehicle compartment mountable to a second vehicle compartment for relative translation therebetween in a first direction, a first actuator mounted to said first vehicle compartment for actuation in a second direction of a follower mounted on a distal end of said actuator, an elongate channel mounted to said second vehicle compartment in a first plane substantially parallel to a plane containing both said first direction and said second direction, said second direction angularly offset in said first plane from said first direction, said channel generally diagonally offset in said first plane from said second direction, said follower mountable in said channel for sliding engagement therealong upon actuation of said first actuator, wherein actuation of said first actuator causes said relative translation between said first and second vehicle compartments.

2. The apparatus of claim 1 wherein said first vehicle compartment is a vehicle and wherein said second vehicle compartment is a laterally-extendable compartment for said vehicle, wherein said laterally extendable compartment is laterally translatably mountable into said aperture in a side of a vehicle for lateral extension therefrom in said first direction into an extended position and for lateral retraction thereinto into a retracted position, wherein in said retracted position a laterally outer surface of said laterally extendable compartment is generally flush with a laterally outer surface of said vehicle, and wherein in said extended position said laterally extendable compartment is cantilevered laterally outwardly from said aperture and said laterally outer surface of said vehicle, wherein said channel is mounted to said laterally extendable compartment, said first plane parallel to said floor, wherein actuation of said follower by translation of said follower in said second direction is generally perpendicular to said first direction, wherein actuation of said actuator so as to translate said follower in said second direction forces relative lateral translation in said first direction between said laterally extendable compartment and said vehicle.

3. The apparatus of claim 2 wherein said channel is, in plan view, angled generally diagonally from a first end of said channel disposed towards the interior of said vehicle to an opposite second end of said channel disposed towards the exterior of said vehicle so that, with said first actuator mounted so that said second direction is substantially perpendicular to said first direction, said first actuator is adjacent said second end of said channel and retracted when said laterally extendable compartment is in said fully retracted position, and said first actuator is adjacent said first end of said channel and extended when said laterally extendable compartment is in said fully extended position.

4. The apparatus of claim 3 wherein said channel is substantially linear.

5. The apparatus of claim 4 wherein said channel forms an acute angle of generally 60 degrees between said channel and said second direction on a side of said channel opposite from said first actuator.

6. The apparatus of claim 5 wherein said first actuator is mounted to a vehicle frame member extending longitudinally along said vehicle and underneath a floor of said laterally extendable compartment, and wherein said channel is mounted to an underside of said floor of said laterally extendable compartment.

7. The apparatus of claim 3 wherein said first and second ends of said channel have corresponding first and second notches formed in side surfaces of said first and second ends for parking said follower into said first or second notches out of operative alignment with the length of said channel extending from said first end to said second end when said laterally extendable compartment is in said fully extended or retracted positions respectively.

8. The apparatus of claim 7 wherein said first and second notches are angled end portions of said channel.

9. The apparatus of claim 2 wherein said laterally extendable compartment includes a compartment floor and wherein said vehicle includes a vehicle floor, and wherein said compartment floor is substantially parallel to at least a portion of said vehicle floor adjacent said laterally extendable compartment when in said retracted position, and wherein said vehicle floor includes a retractable floor panel, retractable beneath said compartment floor when said laterally extendable compartment is in said retracted position, and elevatable so as to be flush with said portion of said vehicle floor when said laterally extendable compartment is in said fully extended position, said floor panel retractable and extendable by actuation of a second actuator mounted to and between said floor panel and a vehicle frame member.

10. The apparatus of claim 9 wherein said second actuator is a linear actuator actuating a pivotal linkage pivotally mounted to said linear actuator and said floor panel.

11. The apparatus of claim 2 wherein said laterally extendable compartment is mountable in said aperture on rails.

12. The apparatus of claim 11 wherein said rails are a pair of rails, one rail of said pair of rails on opposite longitudinal ends of said laterally extendable compartment, said pair of rails slidably mounted on slides oppositely mounted on either side of each said rail to longitudinal ends of said laterally extendable compartment and corresponding longitudinal ends of said aperture.

13. The apparatus of claim 12 wherein said rails are, in vertical cross-section, generally Z-shaped, said slides slidably mountable to ends of said Z-shape so as to mount said slides mounted to said longitudinal ends of said aperture in vertically spaced relation to said slides mounted to said longitudinal ends of said laterally extendable compartment.

14. The apparatus of claim 13 wherein said slides mounted to said longitudinal ends of said aperture generally, at least in part, vertically align over said slides mounted to said longitudinal ends of said laterally extendable compartment.

15. The apparatus of claim 1 wherein said channel is a first channel and said follower is a first follower, said apparatus further comprising a second channel parallel to said first channel and lying in said first plane, a second follower rigidly mounted to, and longitudinally spaced apart from, said first follower by a rigid spacer, said second follower slidably engaging said second channel and forceably sliding therealong upon actuation of said first actuator.

16. An apparatus for selectively actuable relative movement between vehicle compartments comprising:

a first vehicle compartment mounted to a second vehicle compartment for relative translation therebetween in a first direction, a first actuator mounted to said first vehicle compartment for actuation in a second direction of a follower mounted on a distal end of said actuator, an elongate channel mounted to said second vehicle compartment in a first plane substantially parallel to a plane containing both said first direction and said second direction, said second direction angularly offset in said first plane from said first direction, said channel generally diagonally offset in said first plane from said second direction, said follower mounted in said channel for sliding engagement therealong upon actuation of said first actuator, wherein actuation of said first actuator causes said relative translation between said first and second vehicle compartments.

17. The apparatus of claim 16 wherein said first vehicle compartment is a vehicle and wherein said second vehicle compartment is a laterally-extendable compartment for said vehicle, wherein said laterally extendable compartment is laterally translatably mounted into said aperture in a side of a vehicle for lateral extension therefrom in said first direction into an extended position and for lateral retraction thereinto into a retracted position, wherein in said retracted position a laterally outer surface of said laterally extendable compartment is generally flush with a laterally outer surface of said vehicle, and wherein in said extended position said laterally extendable compartment is cantilevered laterally outwardly from said aperture and said laterally outer surface of said vehicle, wherein said channel is mounted to said laterally extendable compartment, said first plane parallel to said floor, wherein actuation of said follower by translation of said follower in said second direction is generally perpendicular to said first direction, wherein actuation of said actuator so as to translate said follower in said second direction forces relative lateral translation in said first direction between said laterally extendable compartment and said vehicle.

18. The apparatus of claim 17 wherein said channel is, in plan view, angled generally diagonally from a first end of said channel disposed towards the interior of said vehicle to an opposite second end of said channel disposed towards the exterior of said vehicle so that, with said first actuator mounted so that said second direction is substantially perpendicular to said first direction, said first actuator is adjacent said second end of said channel and retracted when said laterally extendable compartment is in said fully retracted position, and said first actuator is adjacent said first end of said channel and extended when said laterally extendable compartment is in said fully extended position.

19. The apparatus of claim 18 wherein said channel is substantially linear.

20. The apparatus of claim 19 wherein said channel forms an acute angle of generally 60 degrees between said channel and said second direction on a side of said channel opposite from said first actuator.

21. The apparatus of claim 20 wherein said first actuator is mounted to a vehicle frame member extending longitudinally along said vehicle and underneath a floor of said laterally extendable compartment, and wherein said channel is mounted to an underside of said floor of said laterally extendable compartment.

22. The apparatus of claim 18 wherein said first and second ends of said channel have corresponding first and second notches formed in side surfaces of said first and second ends for parking said follower into said first or second notches out of operative alignment with the length of said channel extending from said first end to said second end when said laterally extendable compartment is in said fully extended or retracted positions respectively.

23. The apparatus of claim 22 wherein said first and second notches are angled end portions of said channel.

24. The apparatus of claim 17 wherein said laterally extendable compartment includes a compartment floor and wherein said vehicle includes a vehicle floor, and wherein said compartment floor is substantially parallel to at least a portion of said vehicle floor adjacent said laterally extendable compartment when in said retracted position, and wherein said vehicle floor includes a retractable floor panel, retractable beneath said compartment floor when said laterally extendable compartment is in said retracted position, and elevatable so as to be flush with said portion of said vehicle floor when said laterally extendable compartment is in said fully extended position, said floor panel retractable and extendable by actuation of a second actuator mounted to and between said floor panel and a vehicle frame member.

25. The apparatus of claim 24 wherein said second actuator is a linear actuator actuating a pivotal linkage pivotally mounted to said linear actuator and said floor panel.

26. The apparatus of claim 17 wherein said laterally extendable compartment is mounted in said aperture on rails.

27. The apparatus of claim 26 wherein said rails are a pair of rails, one rail of said pair of rails on opposite longitudinal ends of said laterally extendable compartment, said pair of rails slidably mounted on slides oppositely mounted on either side of each said rail to longitudinal ends of said laterally extendable compartment and corresponding longitudinal ends of said aperture.

28. The apparatus of claim 27 wherein said rails are, in vertical cross-section, generally Z-shaped, said slides slidably mounted to ends of said Z-shape so as to mount said slides mounted to said longitudinal ends of said aperture in vertically spaced relation to said slides mounted to said longitudinal ends of said laterally extendable compartment.

29. The apparatus of claim 28 wherein said slides mounted to said longitudinal ends of said aperture generally, at least in part, vertically align over said slides mounted to said longitudinal ends of said laterally extendable compartment.

30. The apparatus of claim 16 wherein said channel is a first channel and said follower is a first follower, said apparatus further comprising a second channel parallel to said first channel and lying in said first plane, a second follower rigidly mounted to, and longitudinally spaced apart from, said first follower by a rigid spacer, said second follower slidably engaging said second channel and forceably sliding therealong upon actuation of said first actuator.

* * * * *